United States Patent
Liao et al.

(10) Patent No.: US 11,831,473 B2
(45) Date of Patent: Nov. 28, 2023

(54) REDUCED-COMPLEXITY MAXIMUM LIKELIHOOD SEQUENCE DETECTOR SUITABLE FOR M-ARY SIGNALING

(71) Applicant: CREDO TECHNOLOGY GROUP LTD, Grand Cayman (KY)

(72) Inventors: Yu Liao, Longmont, CO (US); Junqing (Phil) Sun, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 17/656,751

(22) Filed: Mar. 28, 2022

(65) Prior Publication Data

US 2023/0308315 A1    Sep. 28, 2023

(51) Int. Cl.
*H04L 25/03* (2006.01)
(52) U.S. Cl.
CPC .............. *H04L 25/03057* (2013.01)
(58) Field of Classification Search
CPC ......... H04L 25/03006; H04L 25/03019; H04L 25/03057; H04L 25/03267; H04L 25/03324
USPC ................ 375/232, 233, 341, 346, 348, 350
See application file for complete search history.

(56) References Cited

U.S. PATENT DOCUMENTS

| | | | |
|---|---|---|---|
| 5,757,855 A * | 5/1998 | Strolle | H04L 25/03267 375/262 |
| 6,201,832 B1 * | 3/2001 | Choi | G11B 20/10046 375/232 |
| 6,600,794 B1 * | 7/2003 | Agarossi | H04L 25/03178 375/232 |
| 6,625,235 B1 * | 9/2003 | Coker | G11B 20/10175 375/350 |
| 7,248,650 B1 * | 7/2007 | Tung | H04J 13/00 714/794 |
| 8,638,886 B2 | 1/2014 | He | |
| 9,071,479 B2 | 6/2015 | Qian et al. | |
| 9,935,800 B1 | 4/2018 | He | |
| 2002/0054655 A1 * | 5/2002 | Malkemes | H04L 1/06 375/347 |

(Continued)

OTHER PUBLICATIONS

U.S. Appl. No. 17/806,450 as filed in U.S. Patent and Trademark Office, filed Jun. 10, 2022 by Inventors Yu Liao and Junqing Sun, titled: "Receiver Using Pseudo Partial Response Maximum Likelihood Sequence Detection".

(Continued)

*Primary Examiner* — Young T. Tse
(74) *Attorney, Agent, or Firm* — Ramey LLP; Daniel J. Krueger

(57) ABSTRACT

Reduced-complexity maximum likelihood sequence detectors (rMLSD) are disclosed for detecting multibit symbols such as those found in pulse amplitude modulation (PAM), quadrature amplitude modulation (QAM), and phase shift keying (PSK) signal constellations with more than two constellation points. One illustrative digital communications receiver includes: an initial equalizer that derives an initial sequence of symbol decisions from a filtered receive signal, each symbol decision in the initial sequence having a second most likely symbol decision; and a rMLSD that derives a final sequence of symbol decisions by evaluating state metrics only for each symbol decision in the initial sequence and its second most likely symbol decision.

20 Claims, 5 Drawing Sheets

(56) References Cited

U.S. PATENT DOCUMENTS

2003/0231709 A1* 12/2003 Pare, Jr. .................. H04L 23/02
375/233
2019/0372607 A1* 12/2019 Riani .................... H03M 13/09

OTHER PUBLICATIONS

Cioffi, J. M. Chapter 9: Decoding Algorithms. Hitachi Professor Emeritus of Engineering, Marconi Society Fellow, Department of Electrical Engineering, Stanford University. Published no later than Jan. 2021. Retrieved Aug. 25, 2022, from https://cioffi-group.stanford.edu/doc/book/chap9.pdf.

Luo, J., "Fast Maximum Likelihood Sequence Detection Over Vector Intersymbol Interference Channels," 2007 IEEE International Conference on Acoustics, Speech and Signal Processing—ICASSP '07, 2007, pp. III-465-III-468, doi: 10.1109/ICASSP.2007.366573.

Forney, G.D.; "The Viterbi Algorithm," in Proceedings of the IEEE, vol. 61, No. 3, pp. 268-278, Mar. 1973, doi: 10.1109/PROC.1973.9030.

* cited by examiner

REDUCED-COMPLEXITY MAXIMUM LIKELIHOOD SEQUENCE DETECTOR SUITABLE FOR M-ARY SIGNALING

TECHNICAL FIELD

The present disclosure relates to digital communications receivers and, more particularly, to equalizers suitable for use with high-rate signaling and larger signal constellations.

BACKGROUND

As demand continues for ever-lower latencies and ever-higher transfer rates, data communications standards are specifying increasing numbers of data lanes, increasing channel symbol rates in each lane, and increasing numbers of bits per channel symbol. The channel symbols are attenuated and dispersed as they propagate, causing intersymbol interference (ISI) at the receiving end of the channel. When trying to detect the channel symbols, receivers must contend with this ISI in addition to the channel noise that contaminates the receive signal.

Due to their relative low complexities, linear equalizers and decision feedback equalizers (DFE) are typically preferred for facilitating channel symbol detection without undue noise enhancement. Yet as data rates push ever closer to channel capacity, these equalizers may fail to provide sufficiently low error rates. The maximum likelihood sequence detector (MLSD) employs a symbol detection strategy that is optimal from an error rate perspective, but that is often prohibitive from a complexity and power consumption perspective when configured to detect multibit symbols.

SUMMARY

Accordingly, there are disclosed herein reduced-complexity maximum likelihood sequence detectors (rMLSD) for detecting multibit symbols such as those found in pulse amplitude modulation (PAM), phase shift keying (PSK) and QAM (Quadrature Amplitude Modulation) signal constellations with more than two constellation points.

One illustrative digital communications receiver includes: an initial equalizer that derives an initial sequence of symbol decisions from a filtered receive signal, each symbol decision in the initial sequence having a second most likely symbol decision; and a rMLSD that derives a final sequence of symbol decisions by evaluating state metrics only for each symbol decision in the initial sequence and its second most likely symbol decision.

An illustrative receiving method includes: deriving an initial sequence of symbol decisions from a filtered receive signal, each symbol decision in the initial sequence having a second most likely symbol decision; and using a rMLSD to derive a final sequence of symbol decisions by evaluating state metrics only for each symbol decision in the initial sequence and its second most likely symbol decision.

An illustrative semiconductor intellectual property core generates circuitry for implementing a receiving and method as described above.

Each of the foregoing receiver, method, and core implementations may be embodied individually or conjointly and may be combined with any one or more of the following optional features: 1. the initial equalizer is a decision feedback equalizer (DFE) that includes: a summer that combines a feedback signal with the filtered receive signal to produce an equalized signal; a slicer that derives the initial sequence of symbol decisions from the equalized signal; and a feedback filter that derives the feedback signal from the initial sequence of symbol decisions. 2. the slicer further derives the second most likely symbol decision for each symbol decision in the initial sequence. 3. the initial equalizer is a DFE that includes: a precompensation unit that derives tentative symbol decisions from the filtered receive signal; and a multiplexer that selects from the tentative symbol decisions based on preceding symbol decisions in the initial sequence. 4. an error calculation circuit that combines the filtered receive signal with the initial sequence of symbol decisions to determine initial equalization error. 5. a competitive decision circuit that determines the second most likely symbol decisions based on the equalization error and the initial sequence of symbol decisions. 6. the rMLSD includes: branch metric calculation circuitry that combines the initial equalization errors or the filtered receive signal with symbol decisions from the initial sequence and with associated second most likely symbol decisions to determine corresponding equalization errors, and that sums each equalization error with each preceding state metric to obtain branch metrics; and comparators that determine a minimum branch metric for each symbol decision in the initial sequence and each second most likely symbol decision. 7. the rMLSD includes a pair of copy-shift registers that respond to outputs of the comparators to assemble a most likely symbol decision sequence ending in that symbol decision and that second most likely symbol decision. 8. the rMLSD further comprises a state metric comparator that selects the most likely symbol decision sequence, taking a symbol decision from a front of that sequence as a symbol decision for the final sequence.

DETAILED DESCRIPTION

Figure 1:
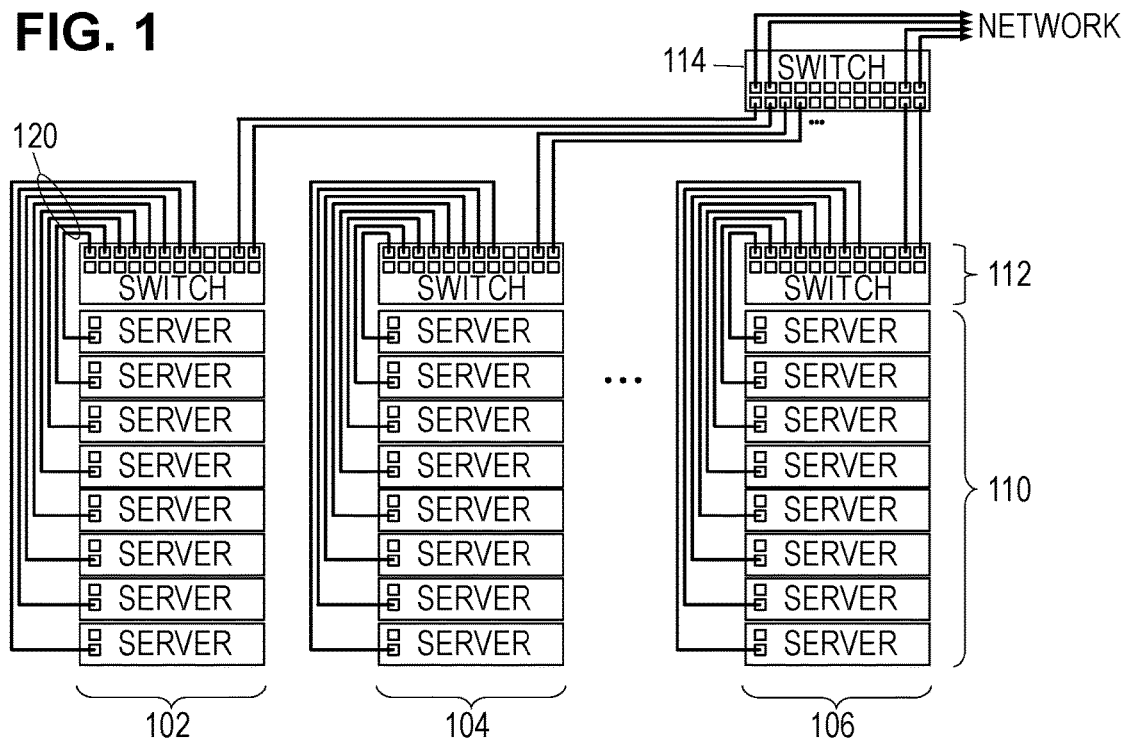
FIG. 1 shows an illustrative network.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

For context, FIG. 1 shows an illustrative network such as might be found in a data processing center, with multiple server racks 102-106 each containing multiple servers 110 and at least one "top of rack" (TOR) switch 112. The TOR switches 112 are connected to aggregator switches 114 for interconnectivity and connection to the regional network and internet. (As used herein, the term "switch" includes not just traditional network switches, but also routers, network bridges, hubs, and other devices that forward network communication packets between ports.) Each of the servers 110 is connected to the TOR switches 112 by network cables 120, which may convey signals with symbol rates high enough to motivate the use of maximum likelihood sequence detectors (MLSD).

Figure 2:
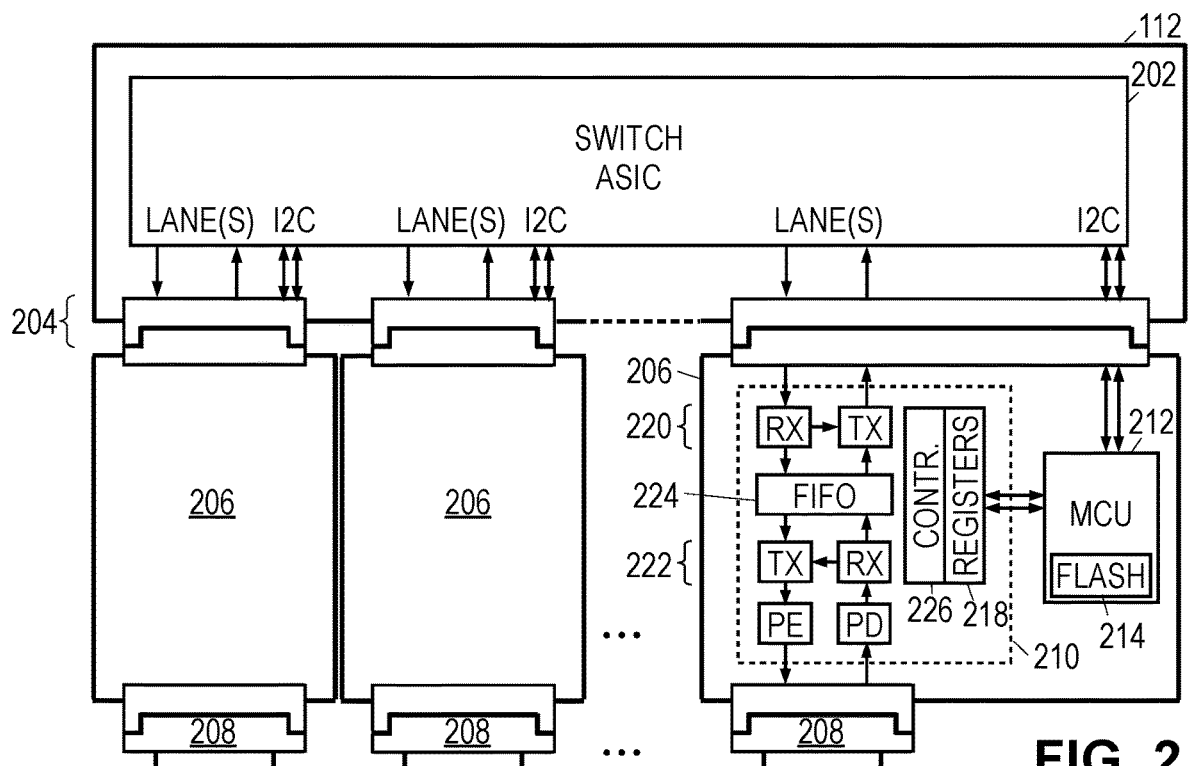
FIG. 2 is a block diagram of an illustrative switch.

FIG. 2 shows an illustrative switch 112 with an application-specific integrated circuit (ASIC) 202 that implements packet-switching functionality coupled to port connectors 204 for pluggable modules 206. Pluggable modules 206 couple between the port connectors 204 and cable connectors 208 to improve communications performance by way of equalization and optional format conversion (e.g., converting between electrical and optical signals). The pluggable modules 206 may comply with any one of various pluggable module standards including SFP, SFP-DD, QSFP, QSFP-DD, and OSFP.

The pluggable modules 206 may each include a retimer chip 210 and a microcontroller chip 212 that controls operation of the retimer chip 210 in accordance with firmware and parameters that may be stored in nonvolatile memory 214. The operating mode and parameters of the pluggable retimer modules 206 may be set via a two wire bus such as 12C or MDIO that connects the microcontroller chip 212 to the host device (e.g., switch 112). The microcontroller chip 212 responds to queries and commands received via the two wire bus, and responsively retrieves information from and saves information to control registers 218 of the retimer chip 210.

Retimer chip 210 includes a host-side transceiver 220 coupled to a line-side transceiver 222 by first-in first-out (FIFO) buffers 224. FIG. 2 shows optional photoemitter (PE) and photodetector (PD) modules to convert between optical line-side signals and electrical host-side signals. Though only a single lane is shown in the figure, the transceivers may support multiple lanes conveyed via multiple corresponding optical fibers or electrical conductors. A controller 226 coordinates the operation of the transceivers in accordance with the control register contents, and may provide for multiple communication phases pursuant to a communications standard such as the Fibre Channel Standard published by the American National Standard for Information Technology Accredited Standards Committee INCITS, which provides phases for link speed negotiation (LSN), equalizer training, and normal operation.

Figure 3:
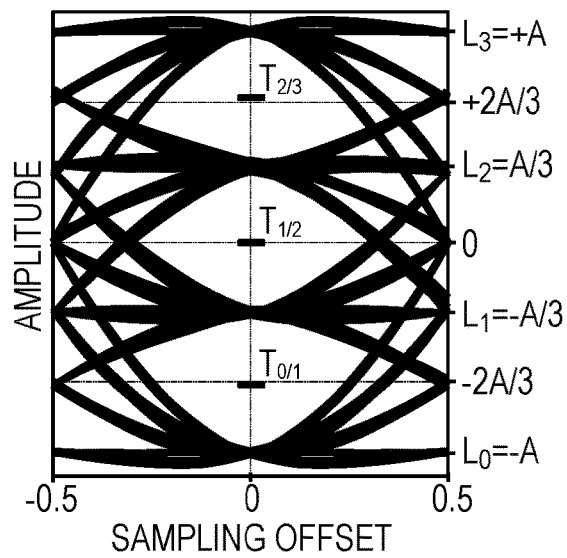
FIG. 3 is an illustrative PAM4 eye diagram.

FIG. 3 is an illustrative PAM4 eye diagram with three decision thresholds $T_{0/1}$, $T_{1/2}$, $T_{2/3}$, to distinguish between the four potential symbols 0, 1, 2, 3, having respective target levels $L_0=-A$, $L_1=-A/3$, $L_2=A/3$, and $L_3=A$. The decision thresholds are nominally set at 0 and $\pm 2A/3$. Noise, interference, and other channel effects cause variation in the signal, spreading the signal paths and reducing the size of the eyes, thereby increasing the probability of symbol detection error.

Figure 4:
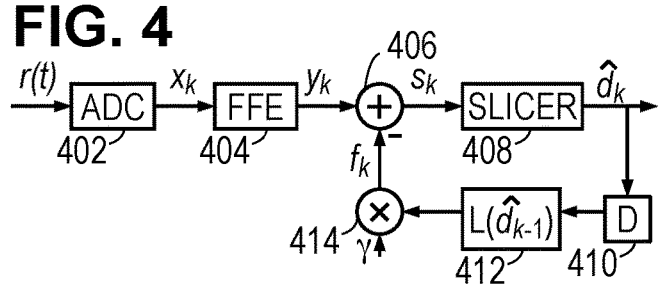
FIG. 4 is a block diagram of a one-tap DFE.

FIG. 4 shows a one-tap DFE. An analog to digital converter (ADC) 402 converts an analog receive signal r(t) to a digital receive signal $x_k$, which may be filtered by a forward equalizer (FFE) 404 to produce a filtered receive signal $y_k$ having minimal leading intersymbol interference (ISI). The FFE 404 can further shape the signal spectrum to limit trailing ISI to one symbol. That is, the filtered receive signal can be expressed:

$$y_k = L(d_k) + \gamma L(d_{k-1}) + n_k, \quad (1)$$

where $d_k \in \{0,1,2,3\}$ represents the transmitted PAM4 symbols, $L(d_k)$ is a mapping of PAM4 symbols to their corresponding signal levels, and $n_k$ represents the noise plus some other impairments.

A summer 406 combines the filtered receive signal with a feedback signal $f_k$ to produce an equalized signal $s_k$ having reduced trailing ISI and thus (in the absence of significant channel noise) having open decision eyes such as those of FIG. 3. A slicer 408 compares the equalized signal to the decision thresholds to determine the symbol decisions $\hat{d}_k$. A delay element 410 latches the symbol decision $\hat{d}_k$ for one symbol interval, making it available during the next symbol interval as the preceding symbol decision $\hat{d}_{k-1}$. A symbol mapper 412 converts the symbol to its target level $L_{\hat{d}_{k-1}}$. A multiplier 414 scales the symbol mapper output by a feedback filter coefficient $\gamma$ to produce the feedback signal $f_k$ for summer 406.

Figure 5:
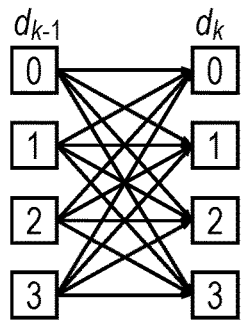
FIG. 5 is a schematic of one Viterbi trellis stage for PAM4.

Instead of a DFE, a conventional MLSD could be applied to the filtered receive signal $y_k$. With the trailing ISI limited to one PAM4 symbol interval, the conventional MLSD would employ a four state trellis such as that shown in FIG. 5 to find the PAM4 sequence $\hat{d} = \{\hat{d}_0, \hat{d}_1, \ldots, \hat{d}_{n-1}\}$ that maximizes the likelihood $\Pr\{Y|\hat{d}\}$, for the sequence of FFE outputs $Y = \{y_0, y_1, \ldots, y_{n-1}\}$.

Each stage of the trellis has 4 states, $s_j^k$, $0 \le j < 4$, representing 4 possible PAM4 symbols of the kth symbol interval. There are 16 possible transitions from previous symbol $d_{k-1}$ to current symbol $d_k$; each transition has a branch metric $b_{i,j}^k$ associated with it, where indices $0 \le i < 4$ and $0 \le j < 4$ represent the 4 possible PAM4 symbols of the previous and current symbol intervals, respectively. The branch metric is computed as follows:

$$b_{i,j}^k = (y_k - L(j) - \gamma L(i))^2 \quad (2)$$

Each state has an associated state metric $c_j^k$ representing the accumulated branch metrics of the maximum likelihood path from start to the state of $s_j^k$. The state metrics are computed as follows:

$$c_j^k = \min_{0 \le i < 4}\left(c_i^{k-1} + b_{i,j}^k\right) \quad (3)$$

Based on above equations, the MLSD finds the maximum likelihood path from the beginning to the end of the sequence, and the maximum likelihood decision sequence is the decision sequence associated with the branches that constitutes the maximum likelihood path.

The conventional MLSD for PAM4 with one symbol interval of trailing ISI requires sixteen branch metric computation units and four 4-way Add Compare Select (ACS) units in the critical timing path for each symbol interval. For data center applications, the power consumption of such components would be prohibitively high at data rates beyond 50 Gbaud.

Figure 10:
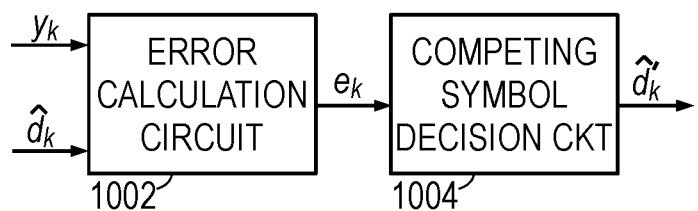
FIG. 10 shows an error calculation circuit.

To implement a reduced-complexity MLSD (rMLSD), we now introduce the concept of a "competing decision". Where the DFE's symbol decision $\hat{d}_k$ is the most likely transmitted symbol for a given $y_k$ and $\hat{d}_{k-1}$, the competing symbol decision $\hat{d}'_k$ is the second most likely transmitted symbol. An error calculation circuit 1002 (FIG. 10) may combine the filtered receive signal $y_k$ with the initial sequence of symbol decisions $\hat{d}_k$ to calculate an equalization error signal $e_k$, which is defined as:

$$e_k = y_k - L(\hat{d}_k) - \gamma L(\hat{d}_{k-1}), \quad (4)$$

enabling a competing symbol decision circuit 1004 to determine the competing symbol decision $\hat{d}'_k$, which for PAM4 is:

| $\hat{d}_k$ | $e_k$ | $\hat{d}'_k$ |
|---|---|---|
| 0 | any | 1 |
| 1 | $e_k < 0$ | 0 |
| 1 | $e_k \geq 0$ | 2 |
| 2 | $e_k < 0$ | 1 |
| 2 | $e_k \geq 0$ | 3 |
| 3 | any | 2 |

We observe that under practical operating conditions, it is highly probable that the transmitted symbol $d_k$ is either equal to $\hat{d}_k$ or equal to $\hat{d}'_k$. Thus the MLSD trellis can be simplified to consider just these potential symbol decisions with minimal performance loss.

Mathematically speaking, let the sequence $d_v = \{d_{v,0}, d_{v,1}, \ldots, d_{v,n-1}\}$, where $d_{v,k} \in \{\hat{d}_k, \hat{d}'_k\}$, $0 \leq k < n$. The proposed low complexity MLSD finds the maximum likelihood sequence $d_v^{max}$ that satisfies the following:

$$d_v^{max} = \max_{d_v} Pr\{Y|d_v\} \quad (5)$$

Figure 6:
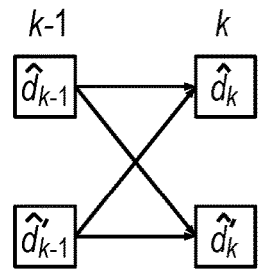
FIG. 6 is a schematic of an illustrative rMLSD trellis stage.

Now, let "0" represent the state that $d_{v,k} = \hat{d}_k$ and "1" the state that $d_{v,k} = \hat{d}'_k$. The proposed low complexity MLSD works on a 2-state trellis shown in FIG. 6. Each stage in the trellis has only 2 states $s_j^k$, $0 \leq j < 2$, and 4 branches with branch metrics $b_{i,j}^k$, $0 \leq i < 2$ and $0 \leq j < 2$. The branch metric is computed as:

$$b_{i,j}^k = (y_k - \hat{y}_k)^2, \quad (6)$$

where $\hat{y}_k$ is given as:

$$\hat{y}_k = \bar{j} * L(\hat{d}_k) + j * L(\hat{d}'_k) + \bar{i} * \gamma * L(\hat{d}_{k-1}) + i * \gamma * L(\hat{d}'_{k-1}) \quad (7)$$

In Equation (7), $\bar{i}$ and $\bar{j}$ are the complementary values of $i$ and $j$, respectively. For example, if $i=0$, $\bar{i}=1$; if $i=1$, $\bar{i}=0$. The state metric $c_j^k$, $0 \leq j < 2$, is computed as follows:

$$c_j^k = \min_{0 \leq i < 2} (c_i^{k-1} + b_{i,j}^k) \quad (8)$$

Each state has a path memory with predefined length to store the decisions of the branches that constitute the survivor path of the state that is the maximum likelihood path from trellis start to the current state. The decision of each branch is the same as the ending state of the branch. Compared to the conventional MLSD, where the decision of each branch has 2 bits, the decision of each branch in the proposed low complexity MLSD has only 1 bit. Unlike the conventional MLSD, which has a complexity that grows quadratically with the constellation size, the rMLSD need not have any complexity increase beyond what is needed by the DFE equalizer.

Figure 7:
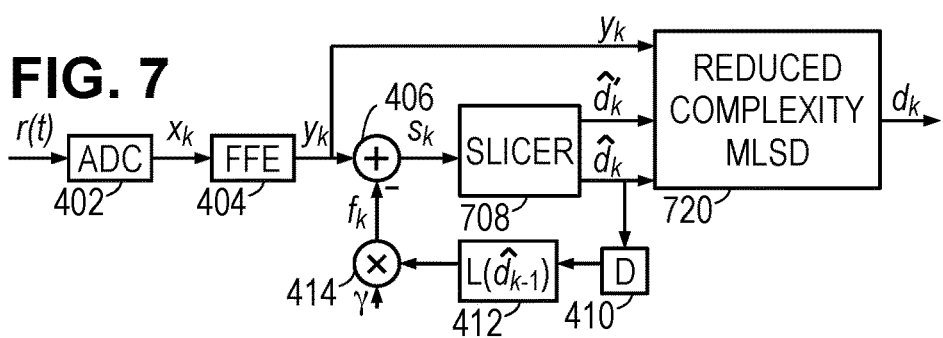
FIG. 7 is a block diagram of an illustrative rMSLD with an initial DFE stage.

FIG. 7 shows an illustrative receiver implementation with a decision feedback equalizer (DFE) providing initial symbol decisions to an rMLSD 720. The slicer 408 (FIG. 4) is replaced here with a slicer 708 that compares the equalized signal to the decision thresholds to determine the initial symbol decisions $\hat{d}_k$ and also compares the equalized signal to the target levels to determine the competing symbol decisions $\hat{d}'_k$. Alternatively, the competing symbol decisions may be determined based on the initial symbol decision and the sign of the equalization error. The rMLSD 720 operates on the filtered receive signal $y_k$, the initial symbol decisions $\hat{d}_k$, and optionally the competing symbol decisions $\hat{d}'_k$, to derive a refined, or "final", sequence of symbol decisions $d_k$.

Figure 11:
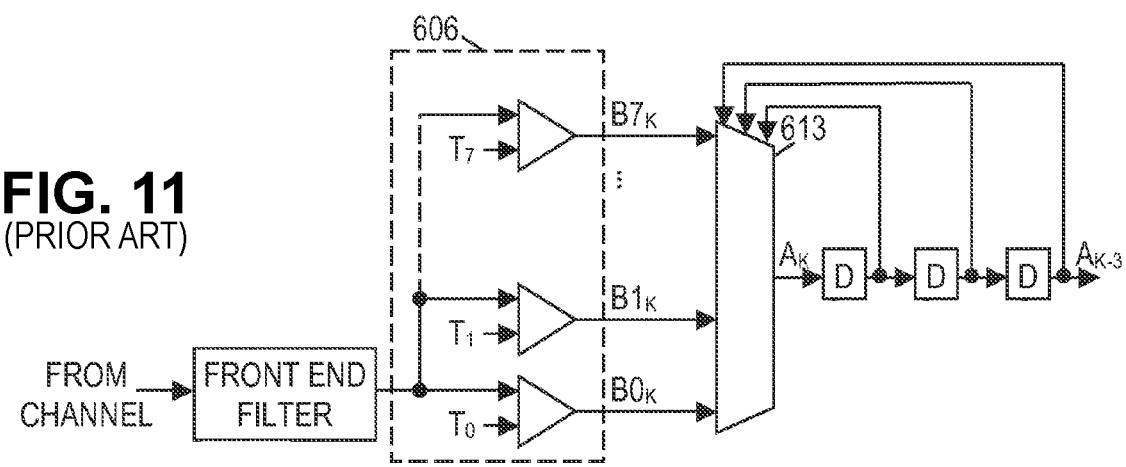
FIG. 11 shows a DFE having a precompensation unit.

The DFE of FIG. 7 employs a feedback filter. As described elsewhere (e.g., FIG. 6 of U.S. Pat. No. 9,071,479 "High-speed parallel decision feedback equalizer", replicated here as FIG. 11), the feedback filter can be "unrolled" using a precompensation unit 606 to generate tentative symbol decisions from which the initial symbol decisions can be selected by a multiplexer 613.

Figure 8:
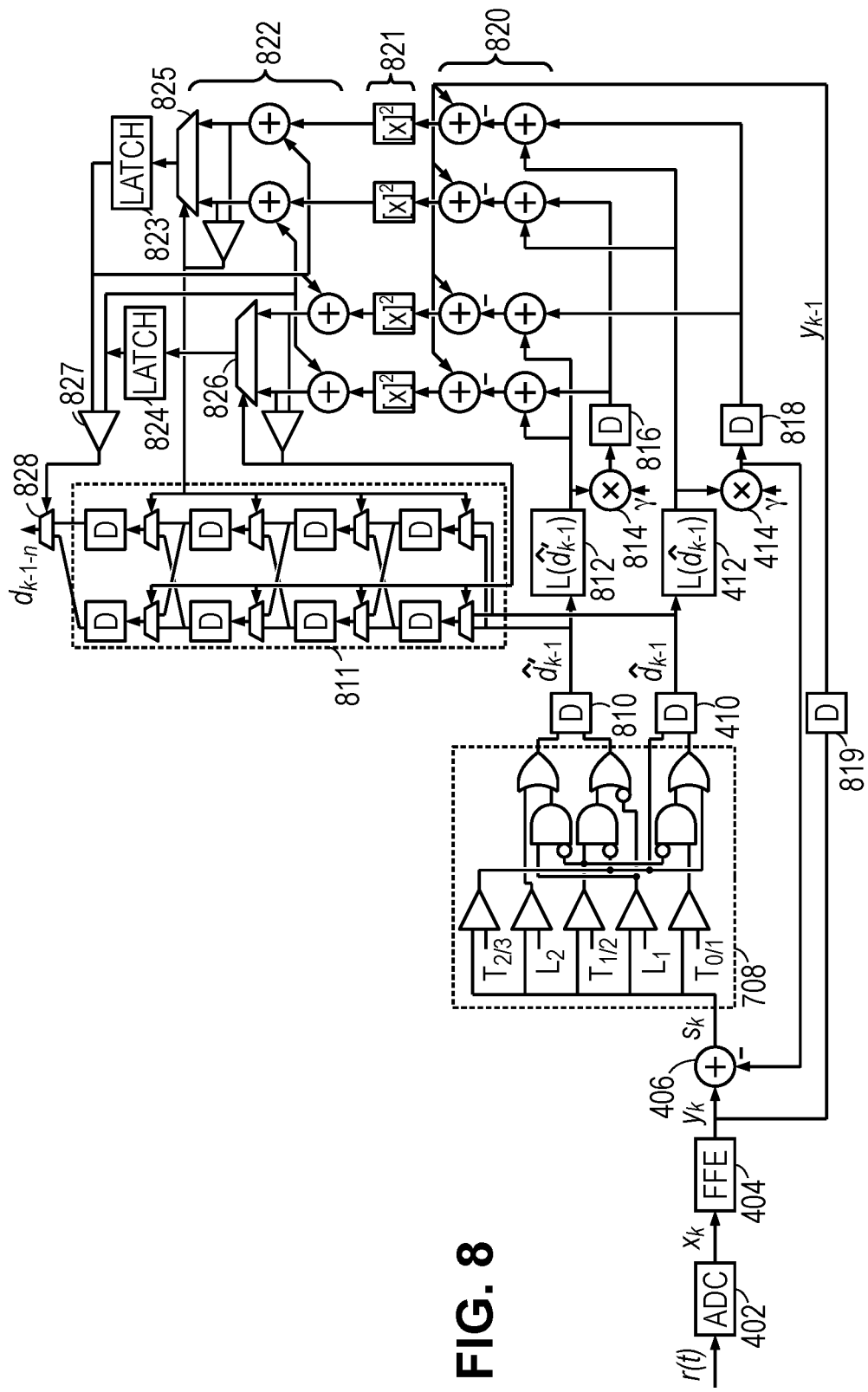
FIG. 8 is a schematic showing additional detail for the receiver of FIG. 7.

FIG. 8 provides additional implementation detail for the slicer 708 and rMLSD 720. Slicer 708 includes a set of comparators that compare the equalized signal $s_k$ to decision thresholds $T_{0/1}$, $T_{1/2}$, $T_{2/3}$, as well as to target levels $L_1$, $L_2$, yielding a set of comparator outputs that are readily converted by logic gates into binary representations of the initial symbol decision $\hat{d}_k$ and the competing symbol decision $\hat{d}'_k$ for the branch metric calculation circuitry (elements 412-414 and 812-814). Delay elements 410, 810 latch these decisions for one symbol interval, supplying them to a pair of "copy-shift" registers 811 and symbol mappers 412, 812.

The symbol mappers 412, 812 convert the binary symbol representation into their corresponding target level. Multipliers 414, 814 scale the mapper outputs by the trailing ISI coefficient $\gamma$, supplying their respective products to delay elements 816, 818. A separate delay element 819 latches the filtered receive signal for one symbol interval. A set of summers 820 combines the outputs of the symbol mappers 412, 812 and delay elements 816, 818, 819, to calculate the different branch errors, which are squared by magnitude elements 821 to provide the various branch metrics of equation (6). In other words, the branch metric calculation circuitry combines the filtered receive signal with symbol decisions from the initial sequence (mapped to their corresponding target levels by mapper 412) and with the associated competing symbol decisions (mapped to their corresponding target levels by mapper 812) to determine the corresponding branch metrics.

Add, compare, select (ACS) circuitry 822 combines the appropriate branch metrics with previous state metrics from latches 823, 824 to obtain path metrics for the current symbol interval. The path metrics are compared and the minimums are selected in accordance with equation (8). Multiplexers 825, 826 steer the selected metrics to the state metric latches 823, 824. The comparator results are provided to the pair of copy-shift registers 811 to steer the initial and competing symbol decisions through a series of latches in a manner that assembles most-probable symbol decision sequences for each trellis state. A state metric comparator 827 may compare the latched state metrics, using output multiplexer 828 to select the symbol decision from the front of the assembled sequence determined to be most probable.

Figure 9A:
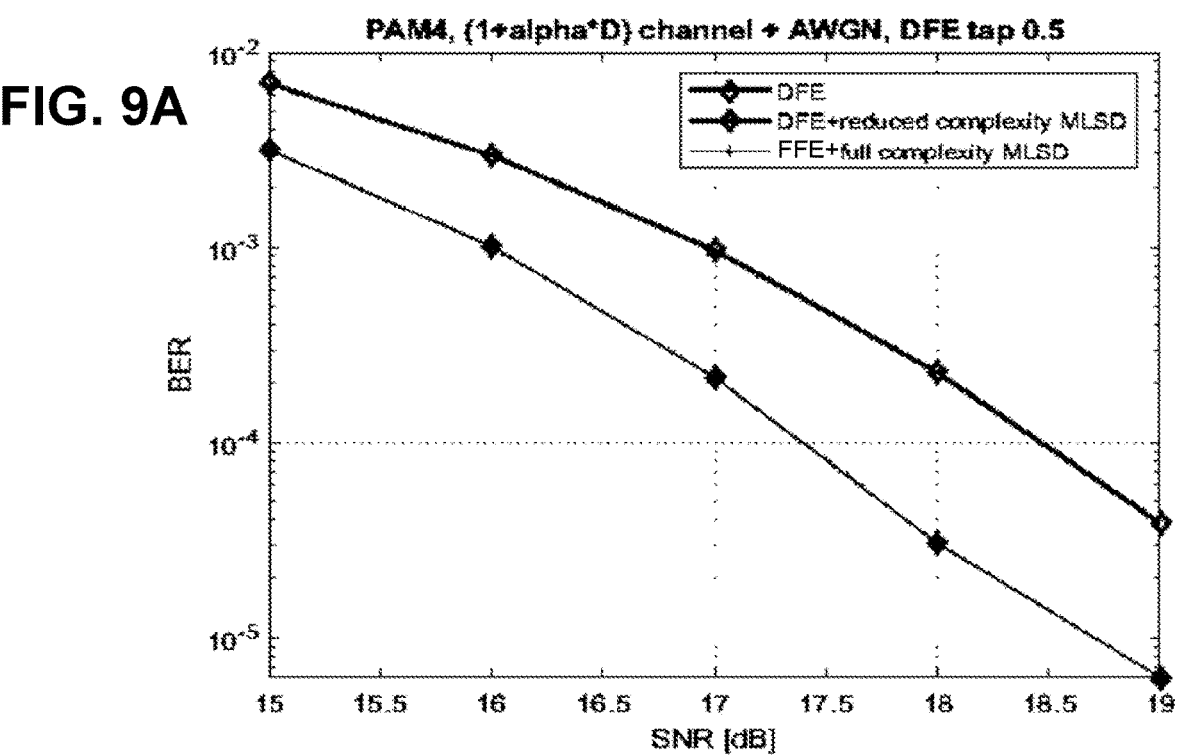
FIGS. 9A-9B are graphs of BER vs. channel SNR.
Figure 9B:
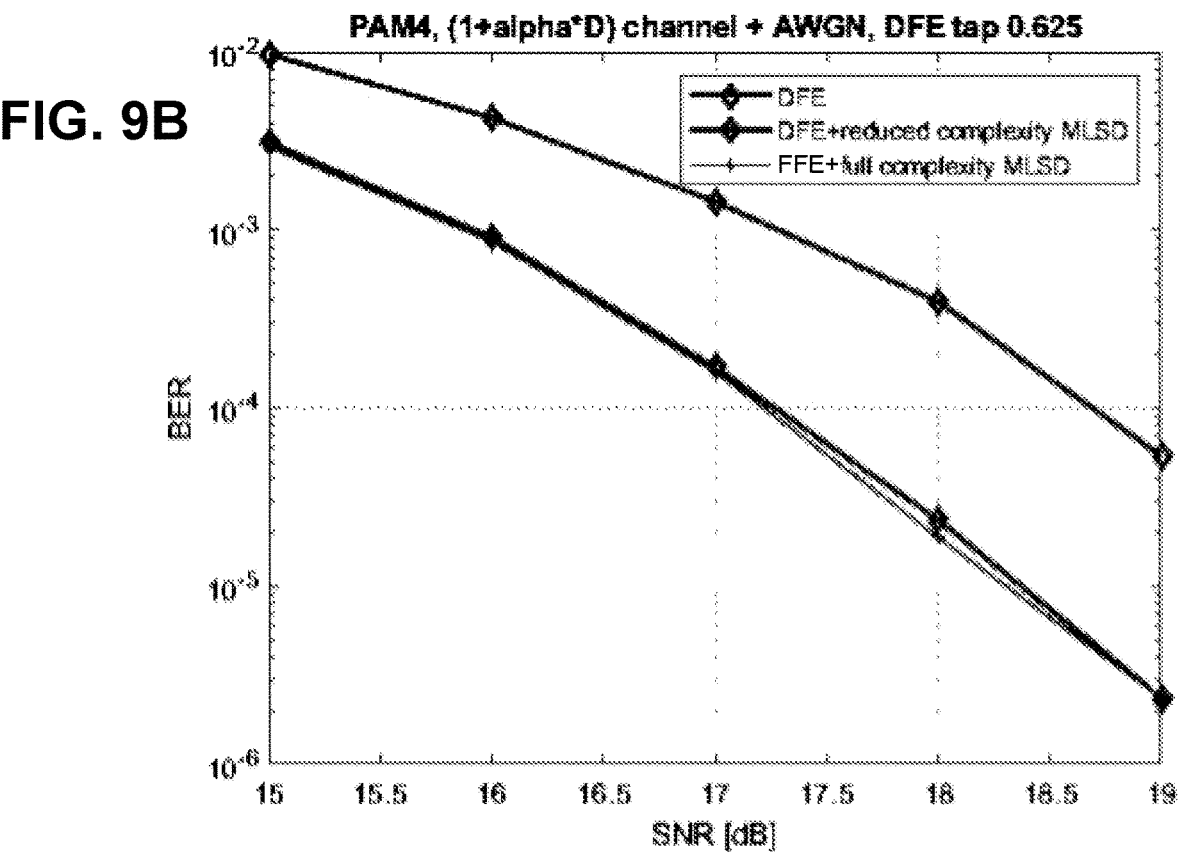

FIG. 9A is a graph comparing the DFE performance to the performance of a DFE+rMLSD combination and that of the FFE+MLSD combination, assuming a trailing ISI coefficient of 0.5. FIG. 9B provides the same comparison assuming a trailing ISI coefficient of 0.625. The rMLSD performance is nearly indistinguishable from the conventional MLSD performance, and each of these exhibits over 1 dB performance gain (FIG. 9A) and 1.5 dB performance gain (FIG. 9B) over DFE alone.

Numerous alternative forms, equivalents, and modifications will become apparent to those skilled in the art once the above disclosure is fully appreciated. For example, the disclosed principles are applicable to both PAM, QAM, and PSK modulation, and to larger signal constellations including 8-PSK, 16-PAM, etc. Though one trailing ISI interval is described in the foregoing, the disclosed principles are also applicable to longer trailing ISI intervals albeit with an increased number of trellis states. It is intended that the claims be interpreted to embrace all such alternative forms, equivalents, and modifications that are encompassed in the scope of the appended claims.

What is claimed is:

1. A receiver comprising:
   a decision feedback equalizer that derives an initial sequence of symbol decisions from a filtered receive signal, each symbol decision in the initial sequence having a second most likely symbol decision; and
   a reduced-complexity maximum likelihood sequence detector (rMLSD) that derives a final sequence of symbol decisions by evaluating state metrics only for each symbol decision in the initial sequence and its second most likely symbol decision.

2. The receiver of claim 1, wherein the decision feedback equalizer comprises:
   a summer that combines a feedback signal with the filtered receive signal to produce an equalized signal;
   a slicer that derives the initial sequence of symbol decisions from the equalized signal; and
   a feedback filter that derives the feedback signal from the initial sequence of symbol decisions.

3. The receiver of claim 2, wherein the slicer further derives the second most likely symbol decision for each symbol decision in the initial sequence.

4. The receiver of claim 1, wherein the decision feedback equalizer comprises:
   a precompensation unit that derives tentative symbol decisions from the filtered receive signal; and
   a multiplexer that selects from the tentative symbol decisions based on preceding symbol decisions in the initial sequence.

5. The receiver of claim 4, further comprising:
   an error calculation circuit that determines an equalization error based on the initial sequence of symbol decisions; and
   a competing symbol decision circuit that determines the second most likely symbol decisions based on the equalization error and the initial sequence of symbol decisions.

6. The receiver of claim 1, wherein the rMLSD comprises:
   branch metric calculation circuitry that combines the filtered receive signal with symbol decisions from the initial sequence and with associated second most likely symbol decisions to determine corresponding branch metrics, and that sums each branch metric with each preceding state metric to obtain path metrics;
   comparators that determine a minimum path metric for each symbol decision in the initial sequence and each second most likely symbol decision; and
   a pair of copy-shift registers that respond to outputs of the comparators to assemble a most likely symbol decision sequence ending in that symbol decision and that second most likely symbol decision.

7. The receiver of claim 6, wherein the rMLSD further comprises a state metric comparator that selects the most likely symbol decision sequence, taking a symbol decision from a front of that sequence as a symbol decision for the final sequence.

8. A receiving method comprising:
   deriving an initial sequence of symbol decisions from a filtered receive signal, each symbol decision in the initial sequence having a second most likely symbol decision; and
   using a reduced-complexity maximum likelihood sequence detector (rMLSD) to derive a final sequence of symbol decisions by evaluating state metrics only for each symbol decision in the initial sequence and its second most likely symbol decision.

9. The receiving method of claim 8, wherein as part of deriving the final sequence of symbol decisions, the rMLSD:
   combines the filtered receive signal or initial equalization error signals with symbol decisions from the initial sequence and with associated second most likely symbol decisions to determine corresponding equalization errors;
   sums each equalization error with each preceding state metric to obtain branch metrics;
   determines a minimum path metric for each symbol decision in the initial sequence and each second most likely symbol decision;
   assembles a first sequence that ends with that symbol decision from the initial sequence; and
   assembles a second sequence that ends with an associated second most likely symbol decision.

10. The receiving method of claim 9, wherein as part of deriving the final sequence of symbol decisions, the rMLSD further:
    compares state metrics for the first and second sequences; and
    provides a symbol decision from a front of a selected one of the first and second sequences as a symbol decision for the final sequence.

11. The receiving method of claim 8, wherein said deriving the initial sequence of symbol decisions is performed by:
    combining a feedback signal with the filtered receive signal to produce an equalized signal;
    comparing the equalized signal to a set of thresholds to obtain the initial sequence of symbol decisions; and
    converting the initial sequence of symbol decisions into the feedback signal.

12. The receiving method of claim 11, further comprising comparing the equalized signal to a set of target symbol levels to derive the second most likely symbol decision for each symbol decision in the initial sequence.

13. The receiving method of claim 8, wherein said deriving the initial sequence of symbol decisions comprises:
    converting the filtered receive signal into tentative symbol decisions using a precompensation unit; and
    using previous symbol decisions in the initial sequence to select from the tentative symbol decisions.

14. The receiving method of claim 13, further comprising:
    combining the filtered receive signal with the initial sequence of symbol decisions to determine an initial equalization error; and
    determining the second most likely symbol decisions based on the initial equalization error and the initial sequence of symbol decisions.

15. A semiconductor intellectual property core that generates circuitry comprising:
    an initial equalizer that derives an initial sequence of symbol decisions from a filtered receive signal, each symbol decision in the initial sequence having a second most likely symbol decision; and
    a reduced-complexity maximum likelihood sequence detector (rMLSD) that derives a final sequence of symbol decisions by evaluating state metrics only for each symbol decision in the initial sequence and its second most likely symbol decision.

16. The semiconductor intellectual property core of claim 15, wherein the rMLSD comprises:
- branch metric calculation circuitry that combines the filtered receive signal or an initial equalization error signal with symbol decisions from the initial sequence and with associated second most likely symbol decisions to determine corresponding equalization errors, and that sums each equalization error with each preceding state metric to obtain branch metrics;
- comparators that determine a minimum path metric for each symbol decision in the initial sequence and each second most likely symbol decision; and
- a pair of copy-shift registers that respond to outputs of the comparators to assemble first and second symbol decision sequences for said minimum path metrics.

17. The semiconductor intellectual property core of claim 16, wherein the MLSD further comprises a state metric comparator that selects one of said first and second symbol decision sequences and provides a symbol decision from a front of the selected symbol decision sequence as a symbol decision for the final sequence.

18. The semiconductor intellectual property core of claim 15, wherein the initial equalizer comprises:
- a summer that combines a feedback signal with the filtered receive signal to produce an equalized signal;
- a slicer that derives the initial sequence of symbol decisions from the equalized signal; and
- a feedback filter that derives the feedback signal from the initial sequence of symbol decisions.

19. The semiconductor intellectual property core of claim 18, wherein the slicer further derives the second most likely symbol decision for each symbol decision in the initial sequence.

20. The semiconductor intellectual property core of claim 15, wherein the initial equalizer comprises:
- a precompensation unit that derives tentative symbol decisions from the filtered receive signal; and
- a multiplexer that selects from the tentative symbol decisions based on preceding symbol decisions in the initial sequence.

\* \* \* \* \*